United States Patent
Rhee et al.

(10) Patent No.: US 8,443,683 B2
(45) Date of Patent: May 21, 2013

(54) DOUBLE-WHEEL CONTROL MOMENT GYROSCOPE

(75) Inventors: Seung-Wu Rhee, Daejeon (KR); Jun-won Son, Seoul (KR); Seung Hyeon Kim, Incheon (KR)

(73) Assignee: Korea Aerospace Research Institute, Daejeon (KR)

( * ) Notice: Subject to any disclaimer, the term of this patent is extended or adjusted under 35 U.S.C. 154(b) by 767 days.

(21) Appl. No.: 12/633,145

(22) Filed: Dec. 8, 2009

(65) Prior Publication Data

US 2010/0139440 A1 Jun. 10, 2010

(30) Foreign Application Priority Data

Dec. 10, 2008 (KR) .................. 10-2008-0125478

(51) Int. Cl.
*G01C 19/54* (2006.01)
(52) U.S. Cl.
USPC ............................................................ 74/5.4
(58) Field of Classification Search
USPC ............. 74/5.4, 5.7, 5.37, 5.95, 5.47, 5.34
See application file for complete search history.

(56) References Cited

U.S. PATENT DOCUMENTS

| | | | | |
|---|---|---|---|---|
| 2,771,778 A * | 11/1956 | Ryberg | ............................ | 74/5 R |
| 3,262,324 A * | 7/1966 | Taylor | ............................ | 74/5.46 |
| 3,619,905 A * | 11/1971 | Stier | ............................ | 33/285 |
| 3,665,283 A * | 5/1972 | Le Gall | ............................ | 318/649 |
| 4,258,578 A * | 3/1981 | Kennel | ............................ | 74/5.34 |
| 4,838,099 A * | 6/1989 | Quermann | ............................ | 74/5.47 |
| 5,233,406 A | 8/1993 | Platt et al. | | |
| 5,419,212 A * | 5/1995 | Smith | ............................ | 74/5.1 |
| 7,554,283 B2 * | 6/2009 | Yazdani Damavandi | ..... | 318/649 |
| 7,804,056 B2 * | 9/2010 | Bishop | ............................ | 250/234 |
| 8,066,226 B2 * | 11/2011 | Fiala et al. | ............................ | 244/171.5 |
| 2005/0026462 A1* | 2/2005 | Johnson et al. | ............................ | 439/13 |
| 2009/0100957 A1* | 4/2009 | Winkel et al. | ............................ | 74/5 R |

OTHER PUBLICATIONS

Decision to Grant a Patent dated Dec. 8, 2010, issued in Korean Patent Application No. 10-2008-0125478.

* cited by examiner

*Primary Examiner* — Ha D Ho
*Assistant Examiner* — Jude Agendia
(74) *Attorney, Agent, or Firm* — The Webb Law Firm

(57) ABSTRACT

Provided is a control moment gyroscope, in which a pair of momentum wheels are symmetrically disposed, thereby reducing torque noise and vibration, increasing output torque, and reducing its size. The control moment gyroscope includes a gimbal rim, a wheel frame having a first wheel frame located inside the gimbal rim and a second wheel frame having the same structure as the first wheel frame and symmetrically coupled with the first wheel frame, a first momentum wheel coupled to the first wheel frame, a second momentum wheel coupled to the second wheel frame corresponding to the first momentum wheel, a gimbal motor installed on an outer circumference of the gimbal rim and connected with first ends of the first and second wheel frames, and an angular velocity sensor installed on the outer circumference of the gimbal rim, connected with second ends of the first and second wheel frames.

10 Claims, 3 Drawing Sheets

DOUBLE-WHEEL CONTROL MOMENT GYROSCOPE

BACKGROUND OF THE INVENTION

1. Field of the Invention

The present invention relates, in general, to a double-wheel control moment gyroscope and, more particularly, to a double-wheel control moment gyroscope in which a pair of momentum wheels are symmetrically disposed, thereby making it possible to reduce torque noise and vibration, increase output torque, and reduce its size.

2. Description of the Related Art

Generally, control moment gyroscopes are used to control the posture of an artificial satellite, and employ gyroscopic torque generated by biaxial moment.

A basic configuration and principle of the gyroscope will be described below with reference to FIG. 1.

The gyroscope includes a gimbal 1 rotated about a first axis S1 by a gimbal motor 2, and a momentum wheel 4 dependently mounted on the gimbal 1 and rotated about a second axis S2 perpendicular to the first axis S1 by a spin motor 3. In this manner, as the gimbal 1 and the momentum wheel 4 are rotated in orthogonal directions, gyroscopic moment T is generated by momenta of the directions of the first and second axes S1 and S2.

This control moment gyroscope is designed such that, when the gimbal 1 is rotated at a certain angular velocity as soon as the momentum wheel 4 is rotated at a high speed, high output gyroscopic torque is generated by the outer product of an angular momentum vector of the momentum wheel 4 and an angular velocity vector of the gimbal 1. The control moment gyroscope generates higher torque than a reaction wheel using this physical phenomenon.

FIG. 2 illustrates an example of a conventional control moment gyroscope.

Referring to FIG. 2, the conventional control moment gyroscope has a structure in which a momentum wheel 20 is rotatably installed inside a gimbal rim 10. The momentum wheel 20 is rotated by a gimbal motor 30 installed on one side of the gimbal rim 10.

The conventional control moment gyroscope as illustrated in FIG. 2 suffers from the following problems because it uses only one momentum wheel.

First, it is difficult to minimize vibration.

In the case of the control moment gyroscope, an imbalance occurs due to a machining error of the momentum wheel, and thus vibration occurs. To prevent this phenomenon, a balance must be kept with respect to a rotational axis of the gimbal, and a product of inertia (i.e. a constant indicating relation between a component in a certain coordinate axis direction, e.g. an x component, of angular momentum and a component in another coordinate axis direction, e.g. a y or z component, of angular velocity) must be minimized.

In this manner, when one momentum wheel is used, the problem of the vibration is solved by manufacturing a new housing of the momentum wheel to connect with the gimbal motor or changing a shape of the rotational axis of the gimbal. However, in the method of manufacturing the new housing of the momentum wheel, the momentum wheel cannot be used as sold by its manufacturer without modification because of shape difference and loss of compatibility with others and also the housing must be precisely machined.

Further, in the method of changing the shape of the rotational axis of the gimbal, a complicated design must be carried out to minimize the product of inertia.

Second, it is difficult to increase output torque.

To increase the output torque of the control moment gyroscope, the momentum wheel having greater angular momentum must be used, or the angular velocity of the gimbal must be increased. The former has a limitation in increasing the size of angular momentum of wheel because of space limit and other technical issues, and increasing the momentum size results in the higher price of the control moment gyroscope. The latter requires the control moment gyroscope to be newly designed.

Thus, the control moment gyroscope must be able to solve the problem of vibration and easily obtain high output torque even when the momentum wheel having low angular momentum is used.

SUMMARY OF THE INVENTION

Accordingly, the present invention has been made with the above problems occurring in the related art in mind, and an object of the present invention is to provide a control moment gyroscope in which a plurality of momentum wheels are installed to keep a balance of mass, thereby enabling a product of inertia to be minimized to solve a problem of vibration.

Another object of the present invention is to provide a control moment gyroscope having a structure in which a plurality of momentum wheels are symmetrically installed.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
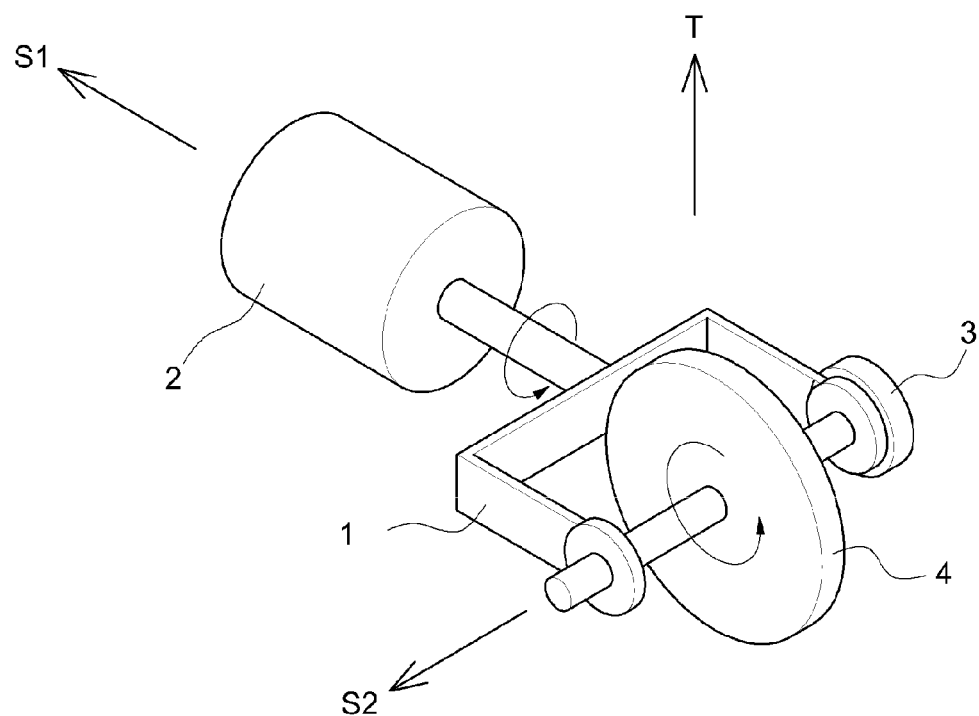
FIG. 1 illustrates a configuration of a basic gyroscope to explain a principle of the gyroscope.
Figure 2:
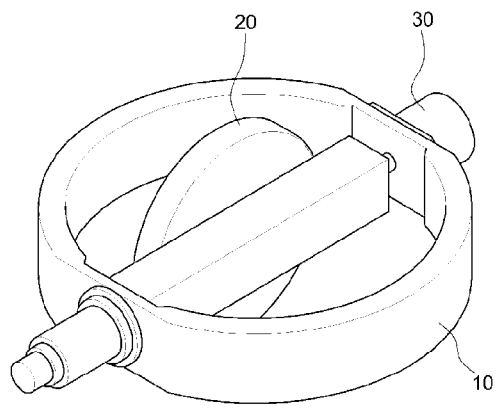
FIG. 2 is a perspective view illustrating a conventional control moment gyroscope.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
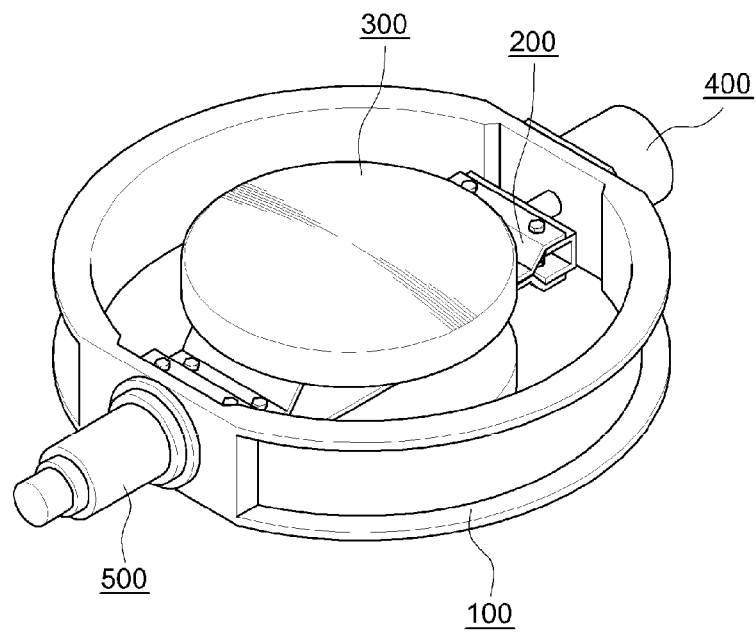
FIG. 3 is a perspective view illustrating a control moment gyroscope according to an exemplary embodiment of the present invention.
Figure 4:
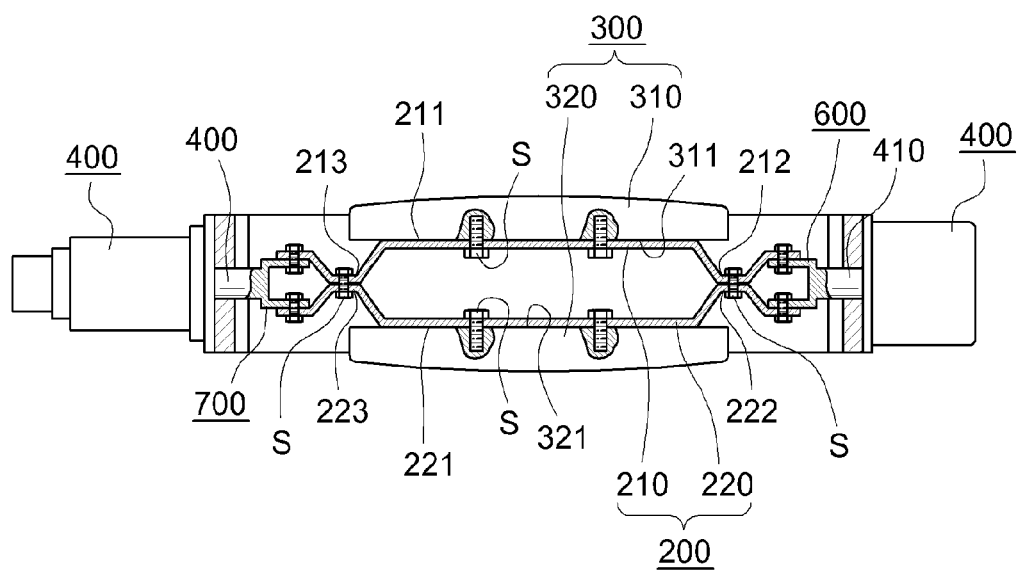
FIG. 4 is a cross-sectional view illustrating a control moment gyroscope according to an exemplary embodiment of the present invention.
Figure 5:
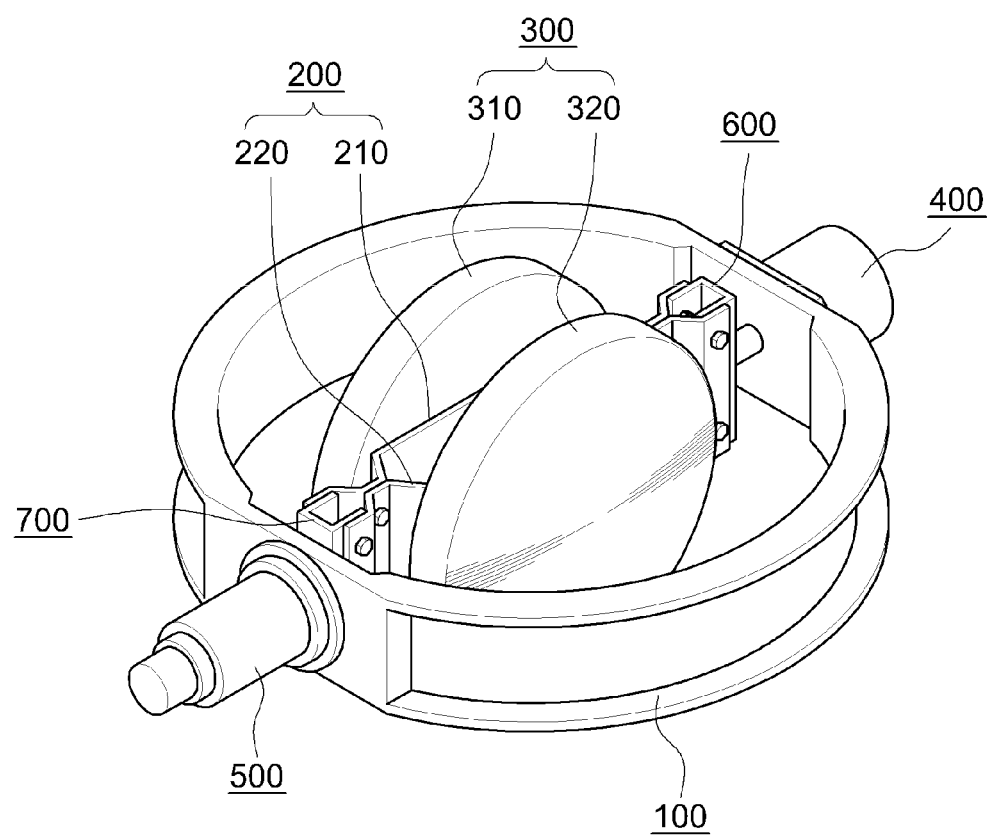
FIG. 5 is a perspective view illustrating operation of a control moment gyroscope according to an exemplary embodiment of the present invention.

FIG. 3 is a perspective view illustrating a control moment gyroscope according to an exemplary embodiment of the present invention. FIG. 4 is a cross-sectional view illustrating a control moment gyroscope according to an exemplary embodiment of the present invention. FIG. 5 is a perspective view illustrating operation of a control moment gyroscope according to an exemplary embodiment of the present invention.

The present invention is directed to a control moment gyroscope having a structure in which a plurality of momentum wheels are installed symmetrically and efficiently. A detailed configuration of the control moment gyroscope is as follows.

In detail, the control moment gyroscope according to an exemplary embodiment of the present invention, as illustrated in FIGS. 3 through 5, generally includes a gimbal rim 100, a wheel frame 200, a pair of momentum wheels 300, a gimbal motor 400, and an angular velocity sensor 500.

The gimbal rim 100 has the shape of a circular band, and serves to support the momentum wheels 300 including the wheel frame 200, the gimbal motor 400, and the angular velocity sensor 500.

The wheel frame 200 is newly installed to effectively support the pair of momentum wheels 300, and thus has a structure for stably installing the pair of momentum wheels 300 (hereinafter, referred to as "first and second momentum wheels 310 and 320") in a symmetrical fashion.

More specifically, the wheel frame 200 is made up of first and second wheel frames 210 and 220, both of which have the same structure and are assembled to be symmetrical to each other.

The first and second wheel frames 210 and 220 are provided with respective flat installation parts 211 and 221, at intermediate portions thereof, to which the first and second momentum wheels 310 and 320 can be stably coupled respectively. The flat installation parts 211 and 221 are spaced apart from each other.

Further, the flat installation parts 211 and 221 are provided with respective fastener parts 212 and 213; and 222 and 223 on opposite sides thereof, which are bent to be in contact with each other and are fastened by fastening means such as screws s. Since these fastener parts 212 and 213; and 222 and 223 are bent from the flat installation parts 211 and 221, this bent structure makes it possible to increase strength of the wheel frame compared to a flat structure.

Also, one ends of the first and second wheel frames 210 and 220 are connected with the gimbal motor 400 by a first connector 600.

At this time, one ends of the first and second wheel frames 210 and 220 are bent from the one-side fastener parts 212 and 222 so as to be spaced apart from each other. The first connector 600 is fastened to the one-side fastener parts 212 and 222 by fastening means such as screws s on one side thereof, and is coupled with a shaft 410 of the gimbal motor 400 on the other side thereof.

The other ends of the first and second wheel frames 210 and 220 are connected with the angular velocity sensor 500 by a second connector 700.

At this time, the other ends of the first and second wheel frames 210 and 220 are bent from the other-side fastener parts 213 and 223 so as to be spaced apart from each other. The second connector 700 is fastened to the other-side fastener parts 213 and 223 by the screws s on one side thereof, and is coupled with a shaft 510 of the angular velocity sensor 500 on the other side thereof.

The first and second momentum wheels 310 and 320 are coupled to the first and second wheel frames 210 and 220 by fastening means such as screws s with flat faces 311 and 321 thereof closely contacted with the flat installation parts 211 and 221 of the first and second wheel frames 210 and 220, respectively.

This control moment gyroscope can obtain twice the angular momentum vector by using two momentum wheels compared to using one momentum wheel.

Further, the two momentum wheels are symmetrically installed, and thereby the product of inertia thereof is minimized. As a result, it is possible to reduce torque noise and the generation of vibration, and thus increase the reliability of the product, i.e. the control moment gyroscope.

As apparent from the above description, in the control moment gyroscope a plurality of momentum wheels are symmetrically installed to keep a balance of mass with respect to the rotational axis of the gimbal rim, thereby making it possible to minimize the product of inertia to obtain a vibration damping effect.

Further, the control moment gyroscope can increase the angular velocity of the gimbal rim without changing the structure of the momentum wheels, and can be easily manufactured and assembled.

In addition, the control moment gyroscope can increase the output torque by increasing the number of momentum wheels.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A control moment gyroscope comprising:
   a gimbal rim;
   a wheel frame having a first wheel frame located inside the gimbal rim and a second wheel frame having the same structure as the first wheel frame and symmetrically coupled with the first wheel frame, wherein each wheel frame has a first end and a second end;
   at least two momentum wheels wherein a first momentum wheel is coupled to the first wheel frame and a second momentum wheel is coupled to the second wheel frame corresponding to the first momentum wheel;
   a gimbal motor installed on one side of an outer circumference of the gimbal rim and connected with first ends of the first and second wheel frames; and
   an angular velocity sensor installed on an other side of the outer circumference of the gimbal rim, connected with second ends of the first and second wheel frames, and measuring angular velocity of the first and second wheel frames,
   wherein the momentum wheels are symmetrically installed.

2. The control moment gyroscope as set forth in claim 1, wherein the first and second wheel frames include flat installation parts such that the first and second momentum wheels are stably installed, respectively.

3. The control moment gyroscope as set forth in claim 2, wherein the flat installation parts of the first and second wheel frames are spaced apart from each other.

4. The control moment gyroscope as set forth in claim 3, wherein the flat installation parts of the first and second wheel frames include fastener parts on opposite sides thereof which are in contact with each other and are screwed to each other.

5. The control moment gyroscope as set forth in claim 4, wherein the first ends of the first and second wheel frames are connected with the gimbal motor by a first connector.

6. The control moment gyroscope as set forth in claim 5, wherein the first ends of the first and second wheel frames are spaced apart from each other.

7. The control moment gyroscope as set forth in claim 4, wherein the second ends of the first and second wheel frames are connected with the angular velocity sensor by a second connector.

8. The control moment gyroscope as set forth in claim 7, wherein the second ends of the first and second wheel frames are spaced apart from each other.

9. A control moment gyroscope comprising:
   a gimbal rim;
   a wheel frame having a first wheel frame located inside the gimbal rim and a second wheel frame having the same structure as the first wheel frame and symmetrically coupled with the first wheel frame;
a first momentum wheel coupled to the first wheel frame;
a second momentum wheel coupled to the second wheel frame corresponding to the first momentum wheel;
a gimbal motor installed on one side of an outer circumference of the gimbal rim and connected with first ends of the first and second wheel frames; and
an angular velocity sensor installed on an other side of the outer circumference of the gimbal rim, connected with second ends of the first and second wheel frames, and measuring angular velocity of the first and second wheel frames,
wherein the momentum wheels are disk-shaped.

10. A control moment gyroscope comprising:
a gimbal rim;
a wheel frame having a first wheel frame located inside the gimbal rim and a second wheel frame having the same structure as the first wheel frame and symmetrically coupled with the first wheel frame;
a first momentum wheel coupled to the first wheel frame;
a second momentum wheel coupled to the second wheel frame corresponding to the first momentum wheel;
a gimbal motor installed on one side of an outer circumference of the gimbal rim and connected with first ends of the first and second wheel frames; and
an angular velocity sensor installed on an other side of the outer circumference of the gimbal rim, connected with second ends of the first and second wheel frames, and measuring angular velocity of the first and second wheel frames,
wherein there are two momentum wheels and, in one rotational position, the profile of the two momentum wheels fits substantially within an envelope of the gimbal rim.

* * * * *